(12) United States Patent
Hartley et al.

(10) Patent No.: US 12,206,567 B2
(45) Date of Patent: *Jan. 21, 2025

(54) DYNAMIC CLONING OF APPLICATION INFRASTRUCTURES

(71) Applicant: Avago Technologies International Sales Pte. Limited, Singapore (SG)

(72) Inventors: Jeffrey P. Hartley, Dublin, OH (US); Atul Gosain, Bangalore (IN)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/899,540

(22) Filed: Aug. 30, 2022

(65) Prior Publication Data

US 2023/0069240 A1 Mar. 2, 2023

Related U.S. Application Data

(63) Continuation of application No. 16/592,778, filed on Oct. 4, 2019, now Pat. No. 11,431,603, which is a
(Continued)

(51) Int. Cl.
*G06F 15/16* (2006.01)
*G06F 9/455* (2018.01)
(Continued)

(52) U.S. Cl.
CPC .......... *H04L 43/16* (2013.01); *G06F 9/45558* (2013.01); *G06F 9/5027* (2013.01); *G06F 9/5083* (2013.01); *H04L 41/0846* (2013.01); *H04L 67/1008* (2013.01); *H04L 67/101* (2013.01); *H04L 67/1029* (2013.01); *H04L 67/1031* (2013.01); *G06F 2009/45562* (2013.01); *G06F 2009/45591* (2013.01)

(58) Field of Classification Search
CPC . G06F 9/45533; H04L 41/0846; H04L 43/16; H04L 67/1002
See application file for complete search history.

(56) References Cited

U.S. PATENT DOCUMENTS 6,779,017 B1 * 8/2004 Lamberton ............. G06F 9/505
718/105
6,826,616 B2 * 11/2004 Larson ................ H04L 61/5076
709/227
(Continued)

OTHER PUBLICATIONS

U.S. Appl. No. 61/895,762, filed Oct. 25, 2013 by Hartley et al.
(Continued)

*Primary Examiner* — Ario Etienne
*Assistant Examiner* — Thorne E Waugh
(74) *Attorney, Agent, or Firm* — Foley & Lardner LLP (57) ABSTRACT

Techniques for dynamically cloning application infrastructures are provided. In one embodiment, a computer system can monitor one or more metrics pertaining to an infrastructure for an application at a first site. If the one or more metrics exceed or fall below one or more corresponding thresholds, the computer system can clone the infrastructure at a second site distinct from the first site, thereby enabling the application to be hosted at the second site.

20 Claims, 6 Drawing Sheets

Related U.S. Application Data continuation of application No. 15/878,988, filed on Jan. 24, 2018, now Pat. No. 10,484,262, which is a continuation of application No. 14/316,161, filed on Jun. 26, 2014, now Pat. No. 9,912,570.

(60) Provisional application No. 61/895,762, filed on Oct. 25, 2013.

(51) Int. Cl.

| | |
|---|---|
| G06F 9/50 | (2006.01) |
| H04L 41/084 | (2022.01) |
| H04L 43/16 | (2022.01) |
| H04L 67/1008 | (2022.01) |
| H04L 67/101 | (2022.01) |
| H04L 67/1029 | (2022.01) |
| H04L 67/1031 | (2022.01) |

(56) References Cited

U.S. PATENT DOCUMENTS

| | | | | |
|---|---|---|---|---|
| 6,868,441 | B2* | 3/2005 | Greene | H04L 63/102 |
| | | | | 709/220 |
| 7,007,299 | B2 | 2/2006 | Ioele et al. | |
| 7,237,023 | B2 | 6/2007 | Menard et al. | |
| 7,383,463 | B2 | 6/2008 | Hayden et al. | |
| 7,941,556 | B2* | 5/2011 | Canali | H04L 9/40 |
| | | | | 370/351 |
| 8,024,441 | B2 | 9/2011 | Kommula et al. | |
| 8,209,415 | B2 | 6/2012 | Wei | |
| 8,234,650 | B1* | 7/2012 | Eppstein | H04L 67/1025 |
| | | | | 718/100 |
| 8,429,630 | B2* | 4/2013 | Nickolov | H04L 67/1021 |
| | | | | 717/148 |
| 8,473,557 | B2* | 6/2013 | Ramakrishnan | G06F 9/4856 |
| | | | | 709/213 |
| 8,478,718 | B1 | 7/2013 | Ranade | |
| 8,484,355 | B1* | 7/2013 | Lochhead | G06F 9/5077 |
| | | | | 709/222 |
| 8,544,002 | B2* | 9/2013 | Edwards | G06F 9/5077 |
| | | | | 718/1 |
| 8,700,729 | B2* | 4/2014 | Dua | G06Q 20/40 |
| | | | | 705/64 |
| 8,793,684 | B2* | 7/2014 | Breitgand | G06F 9/45558 |
| | | | | 718/1 |
| 8,886,865 | B1* | 11/2014 | Huang | G06F 9/45558 |
| | | | | 711/6 |
| 8,914,406 | B1* | 12/2014 | Haugsnes | G06F 9/45558 |
| | | | | 710/316 |
| 9,055,064 | B2* | 6/2015 | Kumar | H04L 63/105 |
| 9,069,608 | B2* | 6/2015 | Antony | G06F 9/45558 |
| 9,110,693 | B1 | 8/2015 | Meiri et al. | |
| 9,137,136 | B2 | 9/2015 | Malloy et al. | |
| 9,141,625 | B1* | 9/2015 | Thornewell | G06F 9/4856 |
| 9,215,239 | B1* | 12/2015 | Wang | G06F 21/566 |
| 9,225,772 | B2 | 12/2015 | Lui et al. | |
| 9,268,583 | B2 | 2/2016 | Tsirkin | |
| 9,509,783 | B1* | 11/2016 | Hayden | H04L 67/14 |
| 9,578,088 | B2* | 2/2017 | Nickolov | H04L 67/34 |
| 9,729,464 | B1 | 8/2017 | Mihailovici et al. | |
| 9,912,570 | B2 | 2/2018 | Hartley et al. | |
| 9,929,931 | B2* | 3/2018 | Breitgand | G06F 9/45558 |
| 10,389,852 | B2* | 8/2019 | Antony | H04L 67/1095 |
| 10,425,481 | B2* | 9/2019 | Falanga | H04L 63/306 |
| 10,469,400 | B2 | 11/2019 | Mihailovici et al. | |
| 10,817,318 | B2* | 10/2020 | Astete | G06F 21/6218 |
| 2004/0210663 | A1* | 10/2004 | Phillips | H04L 69/163 |
| | | | | 709/230 |
| 2005/0065855 | A1* | 3/2005 | Geller | G06Q 20/12 |
| | | | | 705/26.1 |
| 2005/0149940 | A1 | 7/2005 | Calinescu et al. | |
| 2006/0107087 | A1 | 5/2006 | Sieroka et al. | |
| 2006/0229090 | A1* | 10/2006 | LaDue | H04W 84/04 |
| | | | | 455/507 |
| 2008/0034365 | A1 | 2/2008 | Dahlstedt | |
| 2009/0013029 | A1* | 1/2009 | Childress | H04L 67/1095 |
| | | | | 709/203 |
| 2009/0024994 | A1 | 1/2009 | Kannan et al. | |
| 2009/0119673 | A1 | 5/2009 | Bubba | |
| 2010/0169490 | A1* | 7/2010 | McNair | G06F 9/5083 |
| | | | | 709/226 |
| 2010/0211669 | A1 | 8/2010 | Dalgas | |
| 2010/0223364 | A1* | 9/2010 | Wei | H04L 67/1097 |
| | | | | 718/1 |
| 2010/0223378 | A1 | 9/2010 | Wei | |
| 2010/0228819 | A1* | 9/2010 | Wei | H04L 67/1001 |
| | | | | 718/1 |
| 2010/0250746 | A1 | 9/2010 | Murase | |
| 2011/0012902 | A1 | 1/2011 | Rajagopalan et al. | |
| 2011/0035494 | A1 | 2/2011 | Pandley et al. | |
| 2011/0125895 | A1 | 5/2011 | Anderson et al. | |
| 2011/0126275 | A1 | 5/2011 | Anderson et al. | |
| 2011/0154324 | A1 | 6/2011 | Pagan et al. | |
| 2011/0209146 | A1 | 8/2011 | Box et al. | |
| 2011/0209147 | A1 | 8/2011 | Box et al. | |
| 2011/0231568 | A1 | 9/2011 | Bansal et al. | |
| 2011/0265085 | A1 | 10/2011 | Kedem et al. | |
| 2011/0292792 | A1 | 12/2011 | Zuo et al. | |
| 2011/0296024 | A1 | 12/2011 | Madani et al. | |
| 2011/0301998 | A1 | 12/2011 | Talwar et al. | |
| 2011/0314470 | A1 | 12/2011 | Elyashev et al. | |
| 2012/0089980 | A1 | 4/2012 | Sharp et al. | |
| 2012/0317274 | A1 | 12/2012 | Richter et al. | |
| 2013/0014107 | A1* | 1/2013 | Kirchhofer | G06F 9/5083 |
| | | | | 718/1 |
| 2013/0179567 | A1* | 7/2013 | Leighton | H04L 41/509 |
| | | | | 709/224 |
| 2013/0297673 | A1* | 11/2013 | McGrath | G06F 9/505 |
| | | | | 709/203 |
| 2014/0075433 | A1* | 3/2014 | Kotton | G06F 9/5083 |
| | | | | 718/1 |
| 2014/0101279 | A1 | 4/2014 | Nagami et al. | |
| 2014/0258536 | A1 | 9/2014 | Chiong | |
| 2014/0372567 | A1* | 12/2014 | Ganesh | H04L 67/1001 |
| | | | | 709/219 |
| 2014/0372616 | A1* | 12/2014 | Arisoylu | H04L 67/1001 |
| | | | | 709/226 |
| 2015/0039744 | A1* | 2/2015 | Niazi | H04L 41/0895 |
| | | | | 709/224 |
| 2015/0039763 | A1* | 2/2015 | Chaudhary | H04L 67/1023 |
| | | | | 709/226 |
| 2015/0082432 | A1 | 3/2015 | Eaton et al. | |
| 2015/0106813 | A1 | 4/2015 | Mihailovici et al. | |
| 2015/0120913 | A1 | 4/2015 | Hartley et al. | |
| 2017/0302588 | A1 | 10/2017 | Mihailovici et al. | |
| 2018/0336051 | A1* | 11/2018 | Barnes | G06F 9/5083 |
| 2022/0114011 | A1* | 4/2022 | Connor | H04L 47/822 |
| 2022/0121556 | A1* | 4/2022 | Guim Bernat | G06F 11/3636 |

OTHER PUBLICATIONS

U.S. Appl. No. 61/357,692, filed Jun. 23, 2010 by Mihailovici et al.

Brocade Application Resource Broker: Dynamic Resource Provisioning in the Virtualized Data Center With Brocade Application Resource Broker, 2013, Brocade Communications Systems, Inc, 4 pages.

Implementing Virtual Provisioning on EMC Symmetrix OMX with Vmware Virtual Infrastructure, Vmware, EMC Corporation, 2008, pp. 1-30.

Zhu et al., SLA Based Dynamic Virtualized Resources Provisioning for Shared Cloud Data Centers, 2011 IEEE 4th International Conference on Cloud Computing, pp. 630-637.

Bl et al., Dynamic Provisioning Modeling for Virtualized Multi-tier Applications in Cloud Data Center, 2010 IEEE 3rd International Conference on Cloud Computing, pp. 370-377.

(56) References Cited

OTHER PUBLICATIONS

Vmware, "Introduction to Vmware Infrastructure—ESX Server 3.5, ESX Server 3i version 3.5, Virtual Center 2.5," 2006-2007 Vmware, Inc. 46 pages.

* cited by examiner

DYNAMIC CLONING OF APPLICATION INFRASTRUCTURES

CROSS REFERENCES TO RELATED APPLICATIONS

The present application is a continuation of U.S. application Ser. No. 14/316,161, filed Jun. 26, 2014, entitled "DYNAMIC CLONING OF APPLICATION INFRASTRUCTURES" which claims the benefit and priority under 35 U.S.C. 119(e) of U.S. Provisional Application No. 61/895,762, filed Oct. 25, 2013, entitled "VIP CLONING." the entire contents of which are incorporated herein by reference for all purposes.

BACKGROUND

"Pervasive computing," which is the emerging trend of embedding computing technology in commonly-used objects and environments, has changed the way data is consumed and generated. For example, the myriad mobile and wearable computing devices available today (e.g., smartphones, tablets, smartwatches, etc.) enable users to access applications and services, such as video streaming, blogging, social networking, etc., around the clock and on the go.

While pervasive computing has clear benefits for end-users, it also increases the burden on service providers that host the applications/services being consumed. For instance, consider a social networking application, or any other application that deals with user-generated content. For this kind of application, a football game, a concert, or a news event can cause a sudden spike in application traffic near the event location due to, e.g., user posts, uploads of photos and/or videos of the event, and so on. Unfortunately, conventional approaches to application infrastructure management (which generally rely on manual/static setup) do not allow service providers to dynamically scale/adapt their server-side resources to meet the demands of such bursty traffic. As a result, the application may fail or become less responsive in these (and other similar) scenarios.

SUMMARY

Techniques for dynamically cloning application infrastructures are provided. In one embodiment, a computer system can monitor one or more metrics pertaining to an infrastructure for an application at a first site. If the one or more metrics exceed or fall below one or more corresponding thresholds, the computer system can clone the infrastructure at a second site distinct from the first site, thereby enabling the application to be hosted at the second site.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

The present disclosure describes techniques, referred to collectively as "application infrastructure (AI) cloning," for dynamically cloning an infrastructure for an application in response to various criteria. For example, consider a scenario where an application A is hosted by a service provider at a site S1. The infrastructure for application A at site S1 may include a virtual server (identified by a virtual IP address (VIP)) that is configured to, e.g., receive and load balance client requests. The infrastructure may further include one or more application servers that are configured to execute the actual application and process client requests redirected by the virtual server.

Assume that application A experiences an unexpected spike in traffic that causes the infrastructure at site S1 to become overloaded (or reach a state where it will soon be overloaded). For instance, the hardware running the virtual server and/or the application servers may experience high CPU or memory utilization, a large number of concurrent connections, etc. Alternatively, assume that one or more of the hardware and/or software components at site S1 fail. In either of these situations, AI cloning can be used to detect the load/failure condition and automatically create a new infrastructure for application A at another site S2 based on the existing infrastructure at site S1. This process can comprise, e.g., cloning the virtual server and application servers from site S1, such that the cloned versions are created on unused/excess hardware capacity at site S2. The new infrastructure at site S2 can then take over a portion of the application processing previously handled by site S1, thereby reducing the load at site S1 and improving overall application performance.

In certain embodiments, site S2 can be selected for hosting the new infrastructure based on factors that are most likely to improve the performance of application A. For example, in one embodiment, site S2 can be selected based on its proximity to the clients accessing application A, which can reduce the latency experienced by the clients.

Further, in scenarios where the new infrastructure at site S2 was created due to high load at site S1, the AI cloning mechanism can continue monitoring the load at site S1 while site S2 is operational and handling application requests. If the load at site S1 falls below a predefined threshold, the AI cloning mechanism can tear down the cloned infrastructure at site S2, thereby freeing the associated hardware resources so that they may be reused for other purposes (such as supporting new infrastructures for other applications).

These and other features of the present invention are described in further detail in the sections that follow.

2. Exemplary Network Environment

Figure 1:
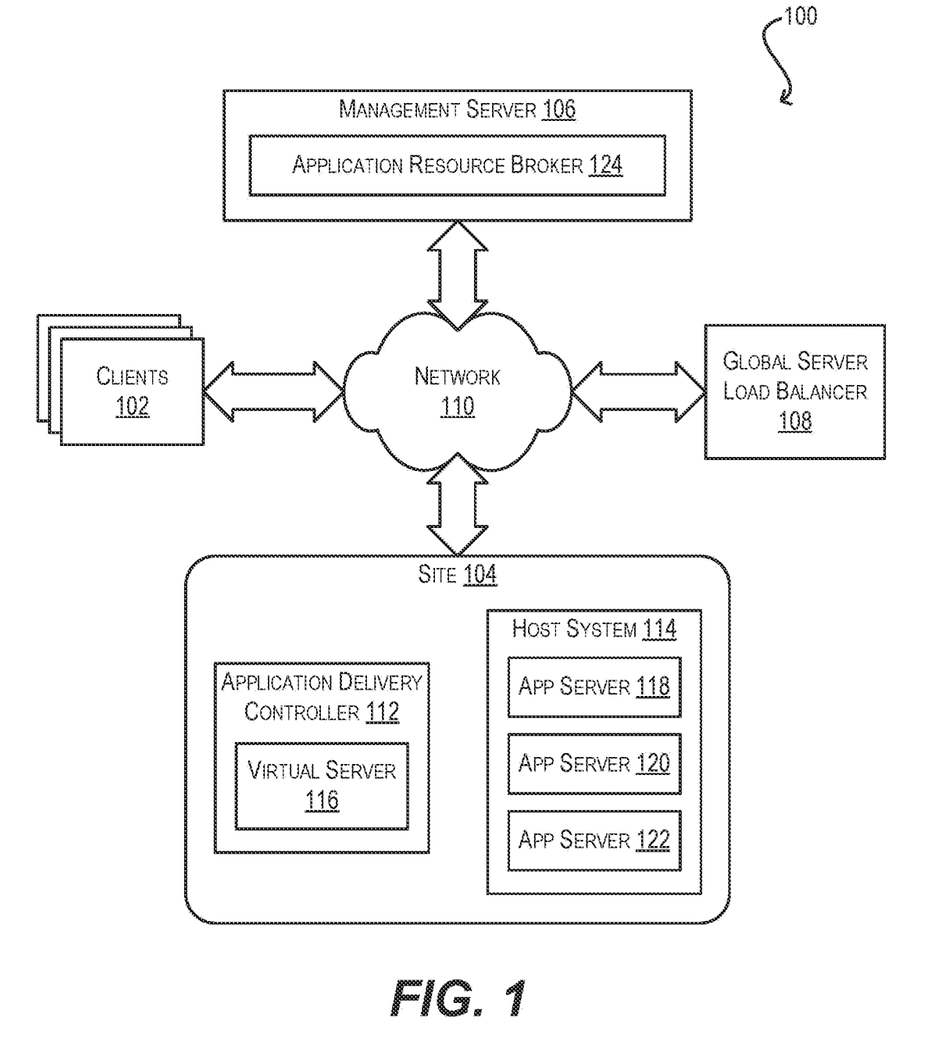
FIG. 1 depicts a network environment according to an embodiment.

FIG. 1 is a simplified block diagram of a network environment 100 in which AI cloning may be implemented according to an embodiment. As shown, network environment 100 includes a number of clients 102, a site 104, a management server 106, and a global server load balancer (GSLB) 108. All of these entities are interconnected via a network 110, which may be a private network (e.g., a LAN), a public network (e.g., a WAN or the Internet), or a combination of private and public networks.

Clients 102 are end-user computing devices, such as a desktop computer, a laptop computer, a personal digital assistant, a smartphone, a tablet, or the like. Clients 102 can each execute (via, e.g., a standard web browser or proprietary software) a client component of a distributed software application, thereby enabling users of clients 102 to use/interact with the application.

Site 104 is a facility/location that houses various computer systems operated by a service provider, the IT department of an enterprise/organization, or some other entity. In a particular embodiment, site 104 can be a data center. Site 104 can provide an environment in which the server-side infrastructure components of a distributed software application can run. For instance, in the example of FIG. 1, site 104 includes an application delivery controller (ADC) 112 comprising a virtual server 116 and a host system 114 comprising application servers 118, 120, and 122. As known in the art, virtual server 116 of ADC 112 can be associated with a virtual IP address (VIP) that is assigned to a particular application running on application servers 118-122. Upon receiving an application request packet directed to the VIP (from, e.g., a client 102), virtual server 116/ADC 112 can perform various Layer 4-7 functions with respect to the packet to enhance and/or accelerate the delivery of the application. For example, virtual server 116/ADC 112 can perform Layer 4-7 traffic redirection, server load balancing, automated failover. TCP connection multiplexing, server offload functions (e.g., SSL acceleration and TCP connection management), data compression, network address translation, and more.

Once virtual server 116/ADC 112 has completed its packet processing, virtual server 116 can forward the request packet to an appropriate application server 118, 120, or 122. The application server can then handle the request by executing the application and generating a response for transmission to the originating client. In the embodiment of FIG. 1, it is assumed that application servers 118, 120, and 122 run within virtual machines (VMs) hosted on host system 114. However, in alternative embodiments, application servers 118, 120, and 122 may run directly on non-virtualized hardware, such as separate physical server systems.

Management server 106 is a computer system or collection/cluster of computer systems that is configured to manage (via. e.g., an application resource broker (ARB) 124) the hardware and software resources of site 104. In one embodiment, management server 106/ARB 124 can be maintained by the same entity that operates site 104. Generally speaking, ARB 124 can implement a policy engine for performing tasks such as managing the lifecycles of virtual server 116 and application servers 118, 120, and 122, monitoring the health and/or capacity of ADC 112 and host system 114, and so on. Additional details regarding the functions of ARB 124 are disclosed in commonly-assigned U.S. patent application Ser. No. 12/909,131, filed Oct. 21, 2010, entitled "METHOD AND APPARATUS FOR PROVISIONING OF RESOURCES TO SUPPORT APPLICATIONS AND THEIR VARYING DEMANDS," which is incorporated herein by reference for all purposes.

Finally, GSLB 108 is a device/computer system that is configured to sit between clients 102 and one or more DNS servers (not shown). When a client 102 submits a DNS request for a particular host name to a DNS server, GSLB 108 can proxy the request and intelligently modify the IP address list returned by the DNS server in view of one or more rules. In particular, GSLB 108 can prioritize (i.e., place at the top of the list) the IP address that is likely to provide the "best" (e.g., fastest and/or most reliable) response to the client. GSLB 108 can then transmit the modified list to the client, thereby causing the client to use the "best" IP address for communicating with the host. Additional details regarding the functionality of GSLB 108 are provided in, e.g., commonly-assigned U.S. Pat. No. 8,024,441, filed Feb. 16, 2007, entitled "GLOBAL SERVER LOAD BALANCING." which is incorporated herein by reference for all purposes.

It should be appreciated that network environment 100 is illustrative and not intended to limit embodiments of the present invention. For example, the various entities depicted in network environment 100 may have other capabilities or include other subcomponents that are not specifically described. One of ordinary skill in the art will recognize many variations, modifications, and alternatives.

3. Flow without AI Cloning

Figure 2:
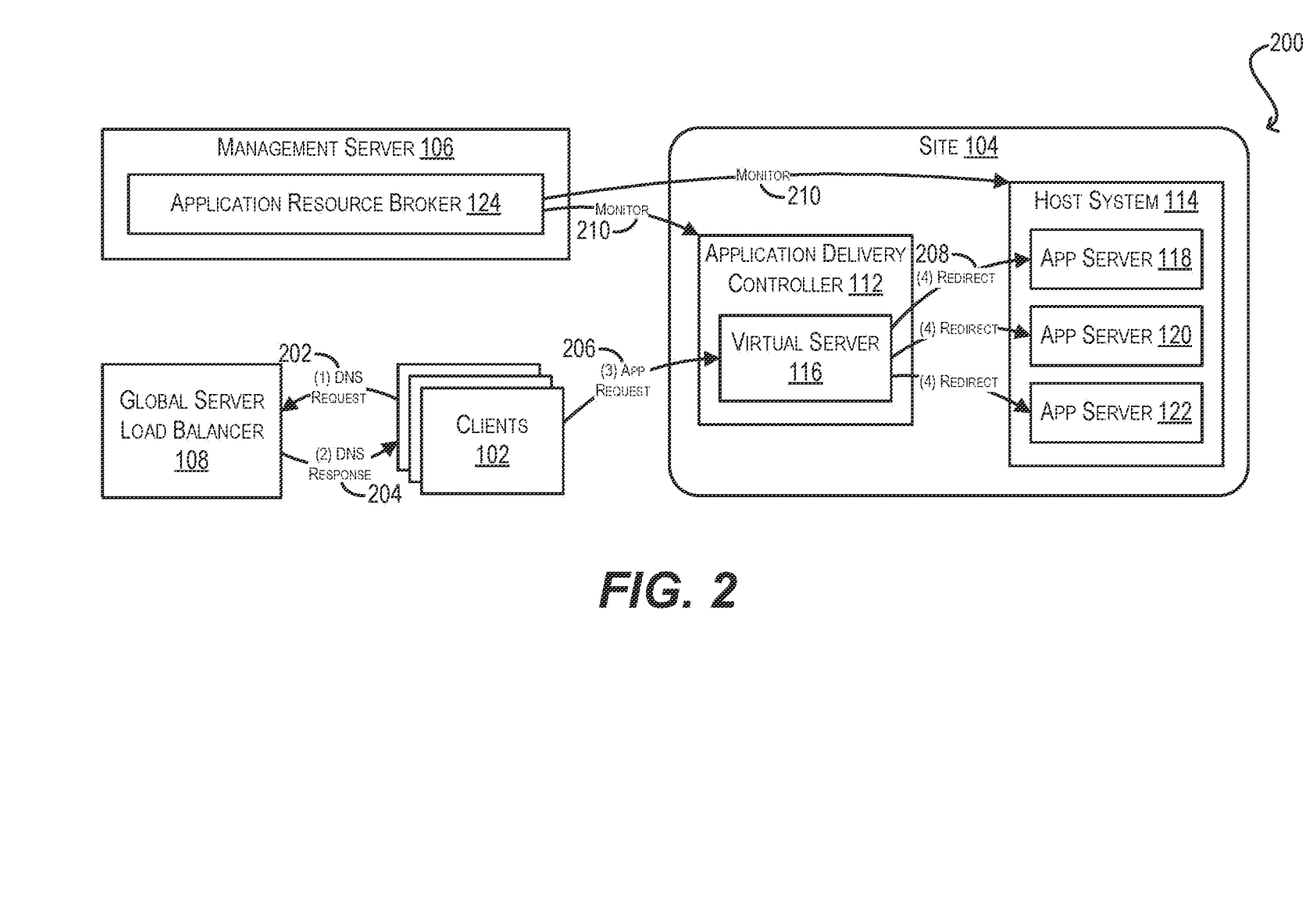
FIG. 2 depicts a flow in the network environment of FIG. 1 without application infrastructure (AI) cloning according to an embodiment.

To provide context for the embodiments described herein. FIG. 2 depicts an example of an application request flow 200 in network environment 100 when AI cloning has not been implemented/enabled. Flow 200 assumes that the application being accessed (e.g., application A) is currently hosted at site 104.

Starting with step (1) (reference numeral 202), client 102 (which is accessing application A for the first time) can send out a DNS request in order to determine the IP address of the application. At step (2) (reference numeral 204), GSLB 108 can intercept the DNS request, communicate with a DNS server (not shown), and return a DNS response that includes the application's 1P address to client 102. Since application A is being hosted at site 104, the 1P address can correspond to the VIP of virtual server 116.

Upon receiving the DNS response, client 102 can transmit an application request packet to the VIP, which is received by virtual server 116 (step (3), reference numeral 206). Virtual server 116 can perform its designated processing on the request packet (e.g., load balancing, compression, etc.) and redirect the packet to one of application servers 118, 120, and 122 on host system 122 (step (4), reference numeral 208). The receiving application server can then process the request packet per the logic of application A, generate a response, and cause the response to be returned, either directly or through virtual server 116/ADC 112, to client 102 (not shown).

Concurrently with the steps above, ARB 124 of management server 106 can monitor metrics with respect to ADC 112/virtual server 116 and/or host system 114/application servers 118-122 (reference numeral 210). ARB 124 can use these metrics to perform various management tasks, such as provisioning/de-provisioning VMs on host system 114, device discovery, capacity/performance reporting, etc.

4. Flow with AI Cloning

Figure 3:
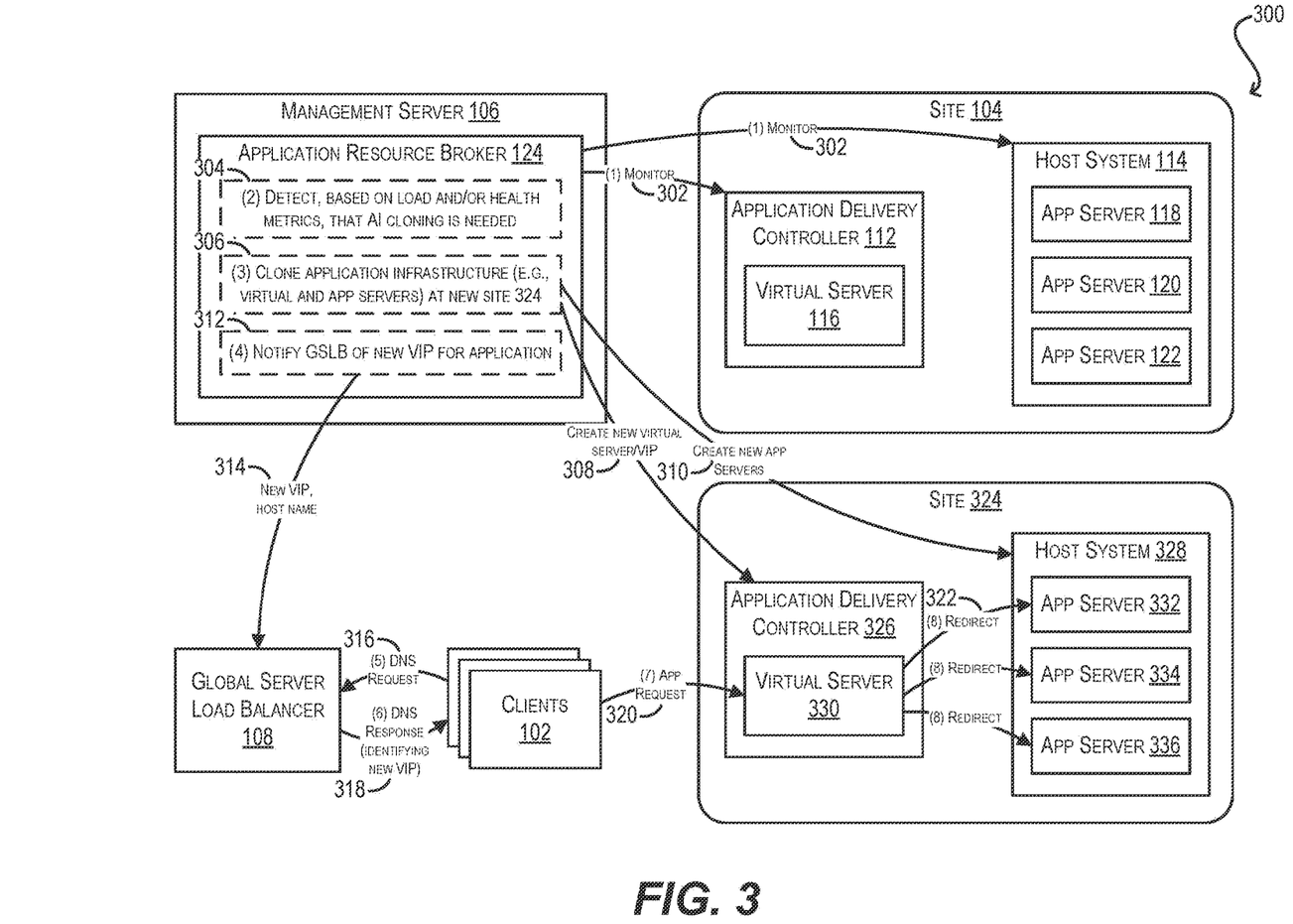
FIG. 3 depicts a flow in the network environment of FIG. 1 with AI cloning according to an embodiment.

As noted previously, one issue with relying on a single, or static number, of site(s)/application infrastructure(s) for serving an application (such as application A in FIG. 2) is that the application service provider may not be able to gracefully handle unexpected bursts in traffic, or scenarios where one or more software/hardware components at the site(s) experience failures. This, in turn, can cause the application to slow down or become unresponsive. To address these and other similar issues, FIG. 3 depicts a high-level flow 300 in network environment 100 where the infrastructure for application A is dynamically cloned from existing site 104 to a new site (324) in response to conditions at the existing site.

Starting with step (1) (reference numeral 302), ARB 124 of management server 106 can monitor load and/or health metrics pertaining to ADC 112/virtual server 116 and/or host system 114/application servers 118-122 of site 104. For example, in one embodiment, ARB 124 can monitor the number of concurrent connections to the VIP for virtual server 116. In another embodiment, ARB 124 can monitor the CPU or memory utilization of ADC 112 or host system 114. In yet another embodiment, ARB 124 can monitor the runtime status of the VMs executing application servers 118-122, such as whether they are active (i.e., powered on), suspended, powered off, etc.

At step (2) (reference numeral 304), ARB 124 can detect, based on the load/health metrics monitored at step (1), that AI cloning should be performed with respect to the infrastructure of application A. This detection may be triggered by, e.g., determining that one or more of the metrics have exceeded (or fallen below) one or more predefined thresholds specified in a user-defined policy.

In response to the detection at step (2). ARB 124 can cause the infrastructure for application A at site 104 to be cloned to a new site 324 (step (3), reference numeral 306). In a particular embodiment, this cloning can comprise creating a new virtual server 330 (with a new VIP) at an ADC 326 of site 324 based on existing virtual server 116 (reference numeral 308), as well as creating new application servers 332, 334, and 336 at a host system 328 of site 324 based on existing application servers 118, 120, and 122 (reference numeral 310).

Further, in order to redirect client traffic to the new VIP at site 324. ARB 124 can send a notification to GSLB 108 that identifies the new VIP as being associated with application A. This notification can include the new VIP and the application's host name. GSLB 108 can then add the new VIP to a list of IP addresses for the application.

Turning now to the application request flow, at step (5) (reference numeral 316), client 102 can send out a DNS request for resolving the IP address of application A. At step (6) (reference numeral 318). GSLB 108 can intercept the request and return a DNS response that include the new VIP at site 324 (rather than the existing VIP at site 104). This may occur because, e.g., client 102 is physically closer to site 324 than site 104.

Upon receiving the DNS response, client 102 can transmit an application request packet to the VIP at site 324, which is received by virtual server 330 (step (7), reference numeral 320). Virtual server 330 can perform its designated processing on the request packet (e.g., load balancing, compression, etc.) and redirect the packet to one of application servers 332, 334, and 336 on host system 328 (step (8), reference numeral 322). The receiving application server can then process the request packet per the logic of application A, generate a response, and cause the response to be returned, either directly or through virtual server 330/ADC 326, to client 102 (not shown).

With the AI cloning mechanism shown in FIG. 3, ARB 124 can automatically create new application infrastructure and offload application traffic to the new infrastructure on an as-needed basis (e.g., in response to load or resource failures), without requiring significant intervention by a user/administrator. For example, in one embodiment, the only input a user/administrator may need to provide to ARB 124 is (1) the policy for controlling when AI cloning is triggered, and (2) the location of hardware resources for creating a new infrastructure. This enables the application service provider to quickly adapt to changing traffic demands/requirements and ensure stable application performance.

Although not shown in FIG. 3, in certain embodiments the AI cloning mechanism can also tear down a cloned application infrastructure once it is no longer needed (e.g., when load at the original site subsides). This tear down flow is described with respect to FIG. 5 below.

5. Detailed ARB Workflows

Figure 4:
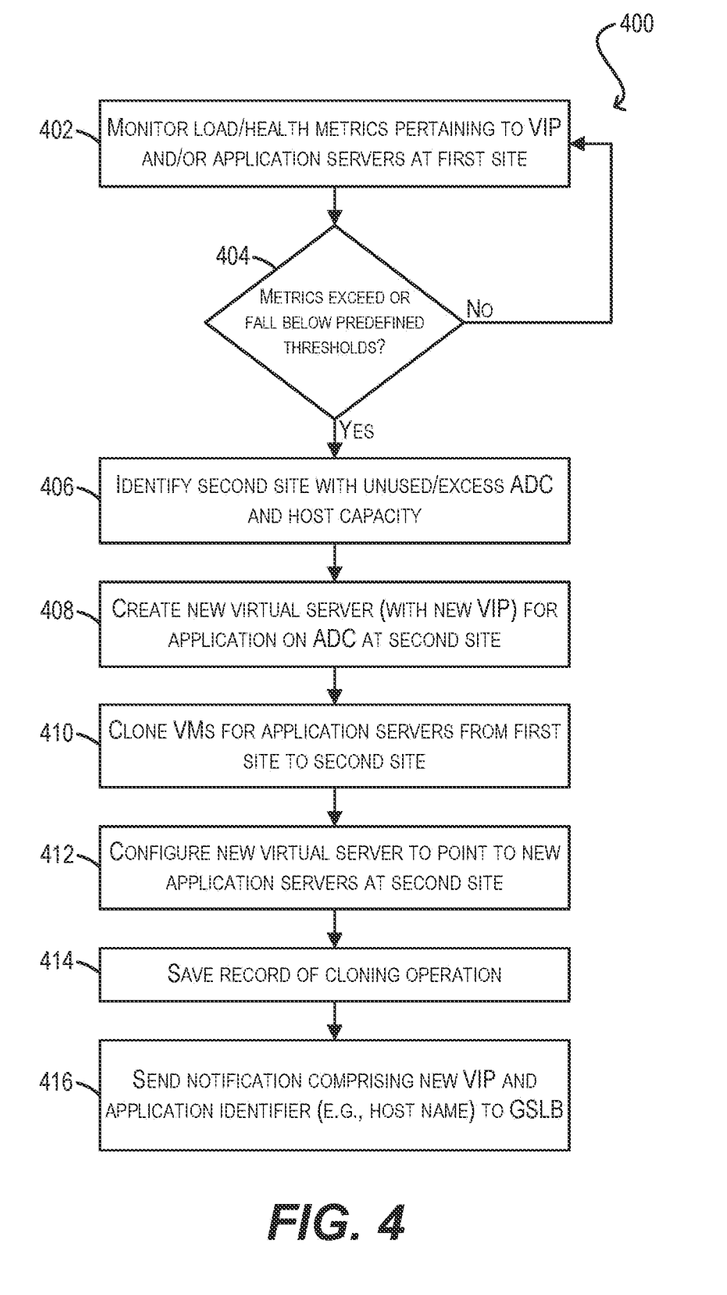
FIG. 4 depicts a flowchart that can be carried out by an application resource broker (ARB) for creating a cloned application infrastructure according to an embodiment.

FIG. 4 depicts a flowchart 400 provides additional details regarding the processing that may be performed by ARB 124 to carry out AI cloning according to an embodiment. At block 402, ARB 124 can monitor load and/or health metrics pertaining to the infrastructure for an application at a first site (e.g., site 104 of FIG. 3). For example, ARB 124 can monitor load and/or health metrics pertaining to virtual server 116, ADC 112, application servers 118-122, and/or host system 114.

At block 404. ARB 124 can determine whether the monitored metrics exceed (or fall below) one or more predefined thresholds. For instance, in the case where ARB 124 monitors the number of concurrent connections to the VIP of virtual server 114, ARB 124 can determine whether this number exceeds a predefined connection threshold. The thresholds may be defined in a policy created by a user/administrator of ARB 124.

If the metrics have not crossed any thresholds, flowchart 400 can return to block 402 and ARB 124 can continue its monitoring.

On the other hand, if one or more thresholds are crossed. ARB 124 can identify a second site (e.g., site 324) that has unused/excess ADC and host capacity. In one embodiment, if there are multiple potential sites. ARB 124 can select a site that is most likely to improve application performance (e.g., the site that is physically closest to the accessing clients, the site that has the most free resources, etc.).

Once identified. ARB 124 can clone a new virtual server (with a new VIP) for the application on an ADC at the second site based on the original virtual server at the first site (block 408). As part of this process, ARB 124 can copy any configuration information pertinent to the virtual server from the first site to the second site.

Further, ARB 124 can clone new application servers for the application on a host system at the second site based on the original application servers at the first site (block 410). Like the virtual server, as part of this process. ARB 124 can copy any configuration information pertinent to the application servers from the first site to the second site. In embodiments where the application servers run within VMs, block 410 can specifically comprising cloning the VMs via known techniques that are supported by the host system hypervisors at the first and second sites.

At blocks 412 and 414, ARB 124 can configure the new virtual server to point to the new application servers at the second site and can save a record of the cloning operation. Finally. ARB 124 can send a notification comprising the new VIP and an application identifier (e.g., host name) to a GSLB (e.g., GSLB 108), thereby enabling the GSLB to redirect new traffic for the application to the new infrastructure at the second site.

Figure 5:
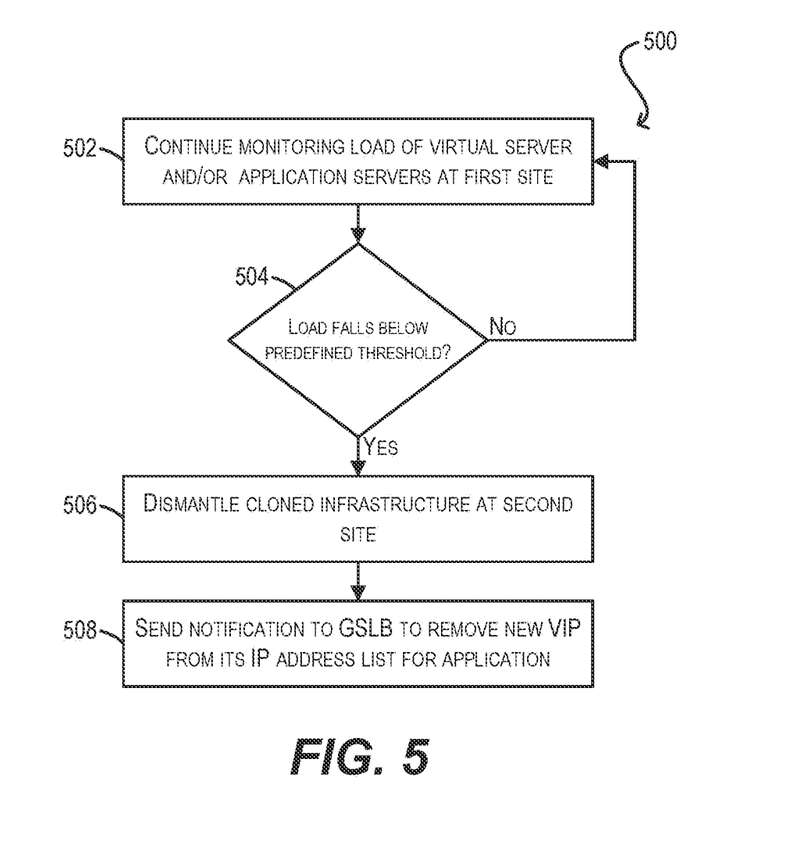
FIG. 5 depicts a flowchart that can be carried out by an ARB for tearing down a cloned application infrastructure according to an embodiment.

As noted previously, in certain embodiments ARB 124 can also dynamically tear down a cloned application infrastructure. FIG. 5 depicts a flowchart 500 of such a process according to an embodiment. Flowchart 500 assumes that ARB 124 has created a new application infrastructure at a second site (per flowchart 400 of FIG. 4) due to high load at a first site.

At block 502. ARB 124 can continue to monitor the load of the virtual server and/or application servers at the first site. Further, at block 504, ARB 124 can check whether the load has fallen below a predefined load threshold. In one embodiment, this predefined load threshold may be specified in the same user-defined policy discussed with respect to block 404 of FIG. 4. In alternative embodiments, the predefined load threshold may be specified in a separate user-defined policy (e.g., a "tear down" policy).

If the load at the first site has not fallen below the load threshold (indicating that the demand at the first site remains high), flowchart 500 can return to block 502 and ARB 124 can continue its load monitoring.

On the other hand, if the load at the first site has fallen below the load threshold. ARB 124 can conclude that the new infrastructure at the second site is no longer needed. As a result, ARB 124 can dismantle the cloned infrastructure at the second site (block 506). In a particular embodiment, this can comprise (1) freeing the hardware (e.g., ADC and host system) resources associated with the virtual server and application servers at the second site, and (2) deleting their associated configurations.

Finally, at block 508, ARB 124 can send a notification to GSLB 108 to remove the new VIP from its list of IP addresses associated with the application, which will cause future application traffic to be directed back to the VIP at the first site.

6. Exemplary Computer System

Figure 6:
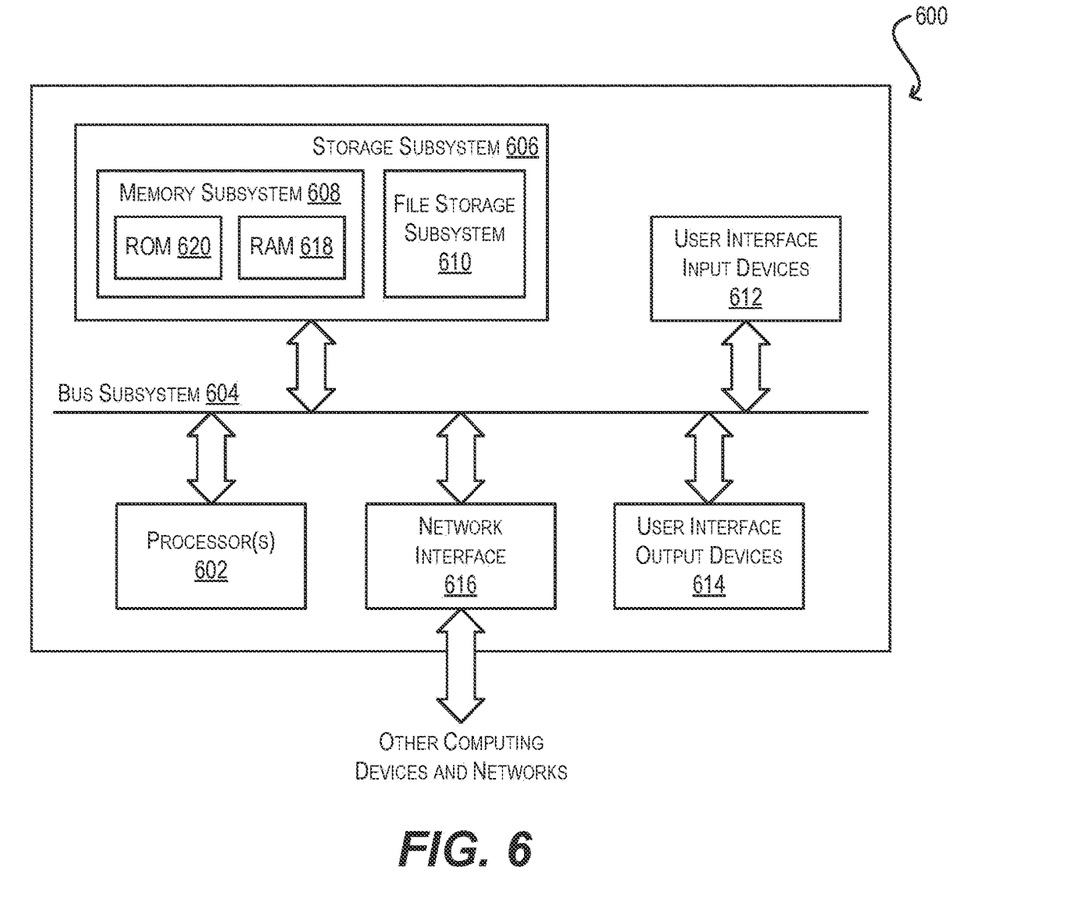
FIG. 6 depicts a computer system according to an embodiment.

FIG. 6 depicts an exemplary computer system 600 according to an embodiment. In one embodiment, computer system 600 can be used to implement management server 106 of FIGS. 1-3. As shown in FIG. 6, computer system 600 can include one or more processors 602 that communicate with a number of peripheral devices via a bus subsystem 604. These peripheral devices can include a storage subsystem 606 (comprising a memory subsystem 608 and a file storage subsystem 610), user interface input devices 612, user interface output devices 614, and a network interface subsystem 616.

Bus subsystem 604 can provide a mechanism for letting the various components and subsystems of computer system 600 communicate with each other as intended. Although bus subsystem 604 is shown schematically as a single bus, alternative embodiments of the bus subsystem can utilize multiple busses.

Network interface subsystem 616 can serve as an interface for communicating data between computer system 600 and other computing devices or networks. Embodiments of network interface subsystem 616 can include wired (e.g., coaxial, twisted pair, or fiber optic Ethernet) and/or wireless (e.g., Wi-Fi, cellular, Bluetooth, etc.) interfaces.

User interface input devices 612 can include a keyboard, pointing devices (e.g., mouse, trackball, touchpad, etc.), a scanner, a barcode scanner, a touch-screen incorporated into a display, audio input devices (e.g., voice recognition systems, microphones, etc.), and other types of input devices. In general, use of the term "input device" is intended to include all possible types of devices and mechanisms for inputting information into computer system 600.

User interface output devices 614 can include a display subsystem, a printer, or non-visual displays such as audio output devices, etc. The display subsystem can be a cathode ray tube (CRT), a flat-panel device such as a liquid crystal display (LCD), or a projection device. In general, use of the term "output device" is intended to include all possible types of devices and mechanisms for outputting information from computer system 600.

Storage subsystem 606 can include a memory subsystem 608 and a file/disk storage subsystem 610. Subsystems 608 and 610 represent non-transitory computer readable storage media that can store program code and/or data used by, e.g., ARB 124 of FIGS. 1-3.

Memory subsystem 608 can include a number of memories including a main random access memory (RAM) 618 for storage of instructions and data during program execution and a read-only memory (ROM) 620 in which fixed instructions are stored. File storage subsystem 610 can provide persistent (i.e., non-volatile) storage for program and data files and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 600 is illustrative and many other configurations having more or fewer components than shown in FIG. 6 are possible.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
   monitoring, by a computing system and over a network, utilization of first processing circuitry or first memory by a first virtual server for an application hosted at a first site;
   determining, by an application resource broker (ARB) configured on the computing system, that the utilization of the first processing circuitry or the first memory satisfies a first usage threshold; and
   dynamically establishing, by the ARB, responsive to determining that the utilization satisfies the first usage threshold, over the network, and at a second site that differs from the first site, a second virtual server to host the application at the second site, the second virtual server utilizing second processing circuitry and second memory at the second site; and communicating, by the ARB responsive to establishing the second site responsive to determining that the utilization satisfies the first usage threshold, an indication to a global server load balancer (GSLB) to cause a response to a domain name service (DNS) request of one or more client devices to resolve an internet protocol (IP) address of the application to direct at least a portion of client traffic from the one or more client devices over the network for the application to the second virtual server utilizing the second processing circuitry and the second memory at the second site to reduce the utilization of the first processing circuitry or the first memory at the first site.

2. The method of claim 1, wherein the dynamically establishing, by the computing system, over the network, and at the second site that differs from the first site, the second virtual server to host the application at the second site comprises:
establishing, by the computing system and over the network, the second virtual server at the second site as a clone of the first virtual server at the first site.

3. The method of claim 1, wherein the causing, by the computing system, the at least the portion of the client traffic over the network for the application to be directed to the second virtual server comprises:
assigning a virtual internet protocol (IP) address to the second virtual server for the application, the virtual IP address differing from another virtual IP address assigned to the first virtual server for the application; and
transmitting, by the computing system and over the network, a notification to a server load balancer that indicates that virtual IP is associated with the application.

4. The method of claim 1, wherein the monitoring, by the computing system and over the network, the utilization of the first processing circuitry or the first memory by the first virtual server for the application hosted at the first site further comprises:
monitoring, by the computing system and over the network, the utilization of the first processing circuitry or the first memory by the first virtual server and a first application server for the application hosted at the first site.

5. The method of claim 4, wherein the dynamically establishing, by the computing system, over the network, and at the second site that differs from the first site, the second virtual server to host the application at the second site, further comprises:
dynamically establishing, by the computing system, over the network, and at the second site that differs from the first site, the second virtual server and a second application server to host the application at the second site.

6. The method of claim 5, wherein the dynamically establishing, by the computing system, over the network, and at the second site that differs from the first site, the second virtual server to host the application at the second site comprises:
establishing, by the computing system and over the network, the second virtual server at the second site as a clone of the first virtual server at the first site; and
establishing, by the computing system and over the network, the second application server at the first site as a clone of the first application server at the first site.

7. The method of claim 1, wherein the second site is one of a plurality of sites, and the method further comprises:

determining, by the computing system, first locations of a plurality of client devices utilizing the application hosted at the first site; and
selecting, by, the computing system, the second site from the plurality of sites based at least in part on proximities of the first locations of the plurality of client devices to second locations of the plurality of sites.

8. The method of claim 1, further comprising:
monitoring, by the computing system and over the network, a number of connections to the first virtual server at the first site for the application, wherein the utilization is determined to satisfy the first usage threshold when the number of connections exceeds a threshold value.

9. The method of claim 1, wherein the utilization satisfies the first usage threshold when the utilization of the first processing circuitry or the first memory by the first virtual server exceeds a threshold value.

10. The method of claim 1, wherein the utilization is determined to satisfy the first usage threshold as a result of an unexpected burst of client traffic corresponding to the application.

11. The method of claim 1, wherein the utilization is determined to satisfy the first usage threshold as a result of a failure of one or more of the first processing circuitry or the first memory.

12. The method of claim 1, further comprising:
after dynamically establishing, by the computing system, over the network, and at the second site that differs from the first site, the second virtual server for the application:
continuing to monitor, by the computing system and over the network, the utilization of the first processing circuitry or the first memory by the first virtual server for the application hosted at the first site;
determining, by the computing system, that the utilization of the first processing circuitry or the first memory satisfies a second usage threshold; and
responsive to determining that the utilization satisfies the second usage threshold:
dynamically tearing down, by the computing system, over the network, and at the second site that differs from the first site, the second virtual server to release the second processing circuitry and second memory at the second site; and
causing, by the computing system, the at least the portion of the client traffic over the network for the application to be directed to the first virtual server at the first site.

13. A device comprising:
a memory; and
processor circuitry configured to:
monitor, over a network, utilization of first processing circuitry or first memory by a first application server for an application hosted at a first site, wherein the application is further hosted at a second site with a second application server utilizing second processing circuitry and second memory at the second site, the second site being distinct from the first site;
an application resource broker (ARB) configured on the processor circuitry to:
determine that the utilization of the first processing circuitry or the first memory satisfies a first usage threshold; and
dynamically tear down responsive to determining that the utilization satisfies the first usage threshold, over the network, and at the second site, the second application server to release the second processing circuitry and the second memory at the second site utilized by the second application server for the application; and communicate, responsive to tearing down the second site responsive to determining that the utilization satisfies the first usage threshold, an indication to a global server load balancer (GSLB) to cause a response to a domain name service (DNS) request of one or more client device to resolve an internet protocol (IP) address of the application to direct client traffic of the one or client devices over the network for the application to the first application server at the first site instead of the second application server at the second site.

14. The device of claim 13, wherein the second application server is a clone of the first application server.

15. The device of claim 14, wherein the processor circuitry is further configured to:
  prior to the determination that the utilization of the first processing circuitry or the first memory by the first application server for the application hosted at the first site satisfies the first usage threshold, determine that the utilization satisfies a second usage threshold; and
  responsive to a determination that the utilization satisfies the second usage threshold:
    establish, over the network, the second application server at the second Previously Presented as the clone of the first application server at the first site.

16. The device of claim 13, wherein the processor circuitry is configured to cause client traffic over the network for the application to be directed to the first application server at the first site instead of the second application server at the second site by:
  transmitting, over the network, a notification to a server load balancer to remove a virtual internet protocol (IP) address associated with the second application server from a list of IP addresses corresponding to the application.

17. The device of claim 13, wherein the dynamically tear down, over the network, and at the second site, the second application server further comprises:
  dynamically tear down, over the network and at the second site, a virtual server and the second application server to release the second processing circuitry and the second memory at the second site utilized at the second site by the virtual server and the second application server for the application.

18. A non-transitory machine-readable medium comprising instructions that, when executed by one or more processor circuits, causes the one or more processor circuits to perform operations comprising:
  monitoring, over a network, utilization of first processing circuitry or first memory by a first application server for an application hosted at a first site;
  determining an application resource broker (ARB) configured on the processor circuits that the utilization of the first processing circuitry or the first memory satisfies a first usage threshold; and
  dynamically establishing the ARB, responsive to determining that the utilization satisfies the first usage threshold, over the network and at a second site that differs from the first site, a second application server to host the application at the second site, the second application server utilizing second processing circuitry and second memory at the second site; and
  communicating, by the ARB responsive to establishing the second site responsive to determining that the utilization satisfies the first usage threshold, an indication to a global server load balancer (GSLB) to cause a response to a domain name service (DNS) request of one or more client device to resolve an internet protocol (IP) address of the application to direct at least a portion of client traffic of the one or more client devices over the network for the application to be directed to the second application server utilizing the second processing circuitry and the second memory at the second site to reduce the utilization of the first processing circuitry or the first memory at the first site.

19. The non-transitory machine-readable medium of claim 18, wherein the dynamically establishing, over the network, and at the second site that differs from the first site, the second application server to host the application at the second site comprises:
  establishing, over the network, the second application server at the second site as a clone of the first application server at the first site.

20. The non-transitory machine-readable medium of claim 19, wherein the causing the at least the portion of the client traffic over the network for the application to be directed to the second application server comprises:
  assigning a virtual internet protocol (IP) address to the second application server for the application, the virtual IP address differing from another virtual IP address assigned to the first application server for the application; and
  transmitting, over the network, a notification to a server load balancer that indicates that virtual IP assigned to the second application server is associated with the application.

\* \* \* \* \*